United States Patent Office 3,011,262
Patented Dec. 5, 1961

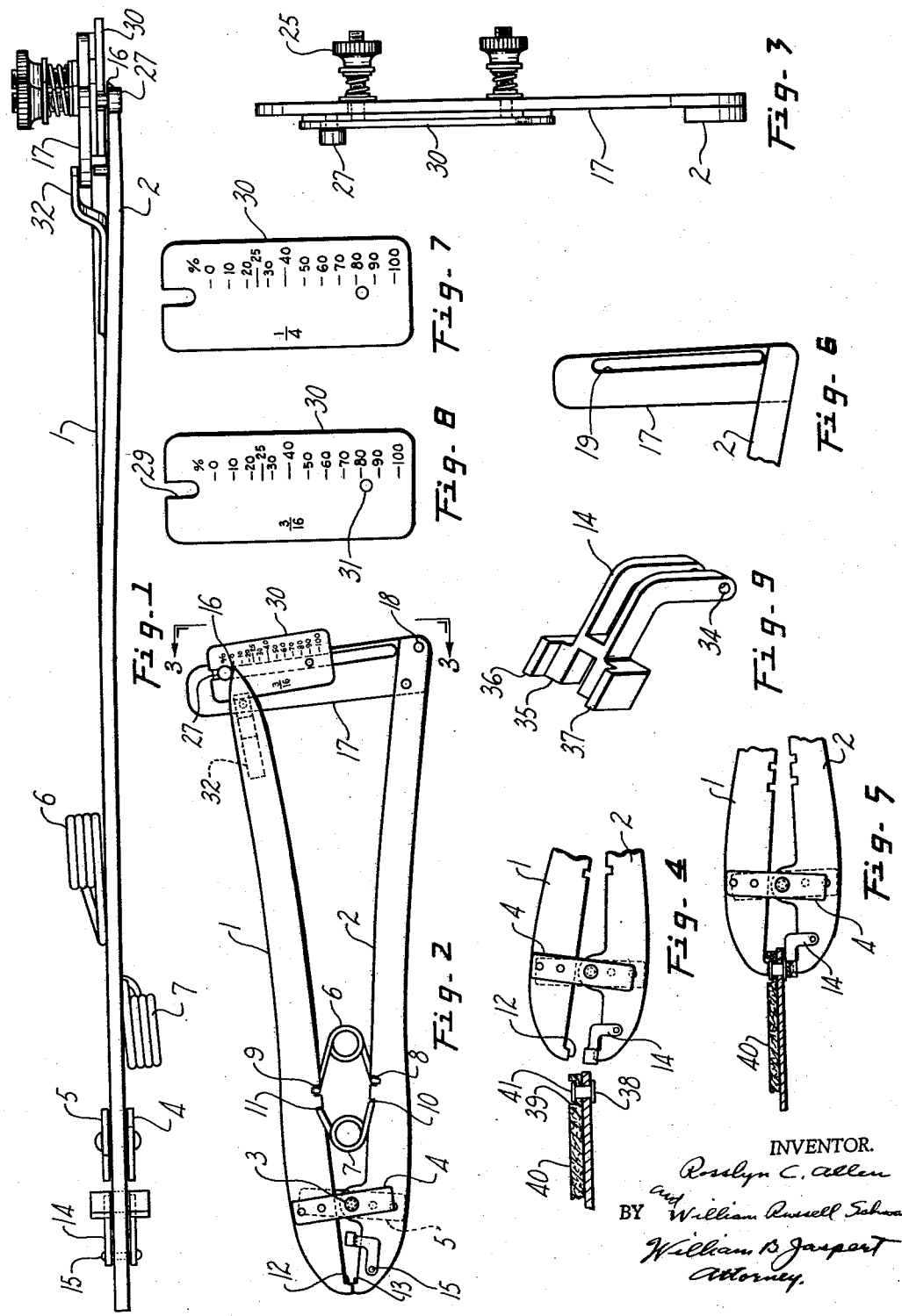

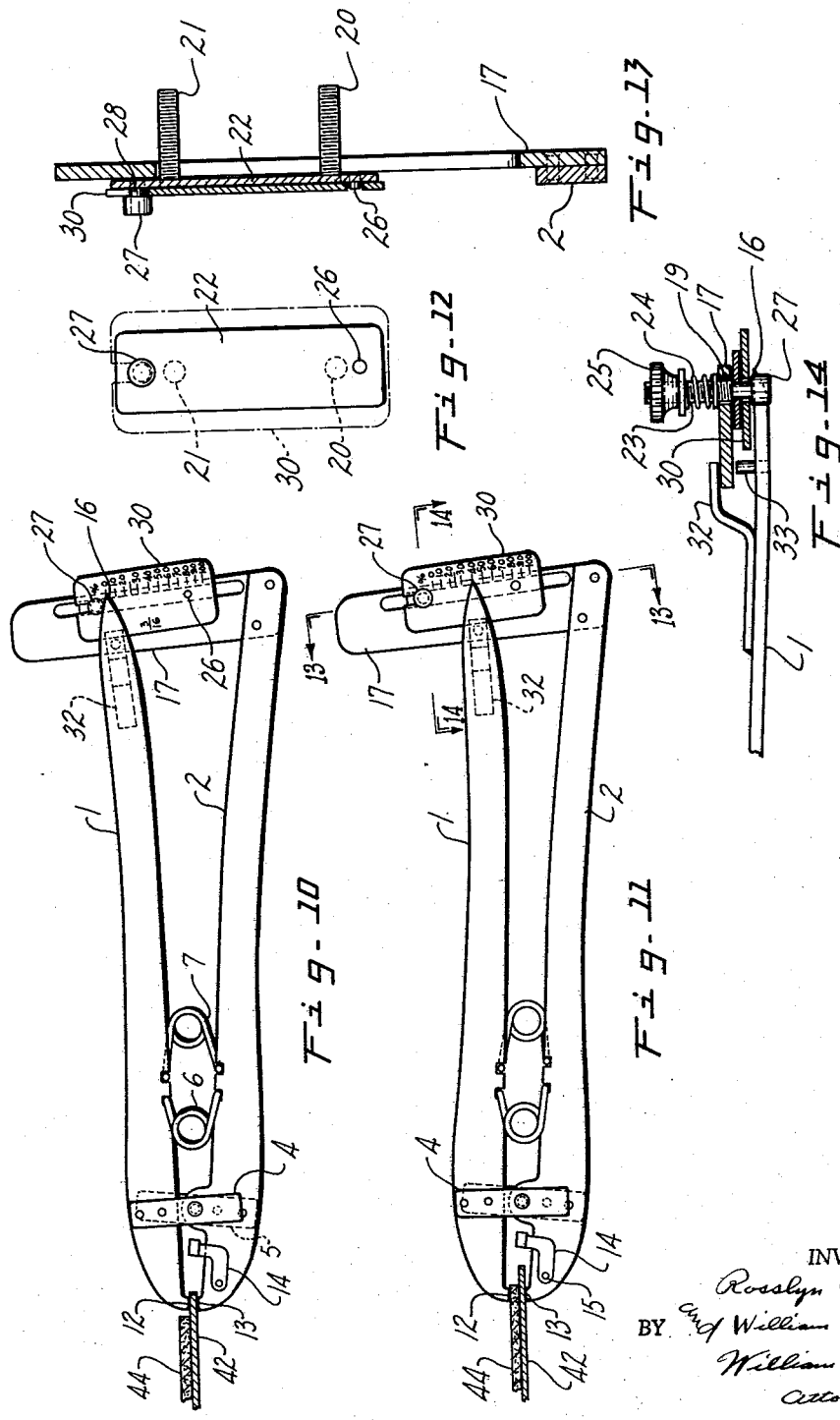

3,011,262
BRAKE LINING THICKNESS GAUGE
Rosslyn C. Allen, 421 N. Braddock Ave., Pittsburgh, Pa.,
and William Russell Schwartz, R.R. 3, Murrysville, Pa.
Filed Feb. 1, 1960, Ser. No. 5,832
3 Claims. (Cl. 33—149)

This invention relates to new and useful improvements in gauges, more particularly to gauges for measuring the thickness of brake linings on automotive vehicles and it is among the objects thereof to provide such brake lining gauges primarily for use with state inspection requirements which are adapted to read the thickness of brake lining in terms of the amount of wear to which such lining was subjected since its inspection.

For example, the gauge is adapted to initially read the thickness of a brake drum and then, by means of a gauge plate, the thickness of the lining and by gauging both the lining and the drum, the gauge plate will show the percentage of the unworn lining that is still mounted on the drum. If, for example, state law will not approve a brake lining of less than 20% of the original thickness, the gauge will show whether such lining must be renewed before a certificate approving operation of the car may be issued.

It is a further object of the invention to provide a brake lining gauge with interchangeable gauge plates calibrated for brake linings of different thicknesses.

It is still a further object of the invention to provide a gauge for measuring the relative thickness of brake lining which is provided with an adaptor at the gauge points for measuring the thickness of the brake lining extending above the rivet with which it is secured to the brake drum.

These and other objects of the invention will become more apparent from a consideration of the accompanying drawings constituting a part hereof in which like reference characters designate like parts and in which:

FIGURE 1 is a top plan view of a brake lining gauge embodying the principles of this invention;
FIGURE 2, a side elevational view thereof;
FIGURE 3, a rear elevational view of the gauge taken along the line 3—3, FIGURE 2;
FIGURE 4, a side elevational view of a fragmentary portion of the gauge and a vertical section of a portion of a brake drum and brake lining;
FIGURE 5, a similar view with the lining gauge in contact with the rivet of the brake drum;
FIGURE 6, a side elevational view of a portion of the guide plate mount for the brake lining gauge;
FIGURE 7, a plan view of the gauge plate;
FIGURE 8, a similar view of the reverse side of the gauge plate of FIGURE 7;
FIGURE 9, an isometric view of the adaptor for use when spanning rivets at the gauging end of the brake lining gauge;
FIGURE 10, a side elevational view showing the gauge points engaging the brake drum;
FIGURE 11, a similar view with the gauge points in measuring contact with the brake drum and brake lining material;
FIGURE 12, a top plan view of a filler plate;
FIGURE 13, a cross-sectional view taken along the line 13—13 of FIGURE 11; and,
FIGURE 14, a cross section taken along the line 14—14, FIGURE 11.

With reference to the several figures of the drawing, the numerals 1 and 2, FIGURE 2, represent a pair of gauge arms hinged at 3, each provided with a guide plate 4 and 5 which are overlapping so that the flat finger-like gauge arms 1 and 2 are held in place by each other. The gauge arms 1 and 2 are connected by torsion springs 6 and 7 fitted in notches 8, 9, 10 and 11 of the gauge arms 1 and 2 to normally bias the gauge to the position shown in FIGURE 2 with the gauge points 12 and 13 contacting. Mounted on the front end of the lower gauge arm 2 is an adaptor generally designated by 14 which is pivoted at 15.

The gauge arm 1 is provided with a pointer generally designated by the numeral 16 and the gauge arm 2 is secured to a guide plate 17 as by riveting, as shown at 18, or by welding or in any other suitable manner.

As shown in FIGURE 6, the guide plate 17 is provided with a slot 19 for receiving screw bolts 20 and 21 of a filler plate 22 to which the screw bolts are integrally joined, as by welding or brazing with a threaded body portion 23 of the size of slot 19, FIGURE 14, extending up through the slot 19 of the guide plate 17. A coil spring 24 is disposed between a knurled thumb nut 25 and the guide plate 17. The filler plate 22 is free to slide within the limits of the slot 19 when the thumb nuts 25 are loosened, the springs 24 supplying sufficient tension to maintain sliding contact of the filler plate 22 with the guide plate 17.

As shown in FIGURE 12, the filler plate is provided with a dowel pin 26 and a stop pin 27, both of which are fixed in the filler plate 22. As shown in FIGURE 13, the stop in 27 is provided with a reduced body portion 28 for receiving the slots 29 of a gauge plate 30. The gauge plates are also provided with a drill hole 31 that fits the dowel pin 26 of the filler plate 22 so that by sliding the gauge plate 30 underneath the head of the stop pin 27 and placing the drill hole 31 over the dowel pin 26, it is held in position against the stop pin 27.

The pointer end 16 of the gauge arm 1 overlaps the gauge plate 30 so that it is not readily displaced from its position between dowel pin 26 and stop pin 27.

As shown in FIGURE 14, the arm 1 is further provided with an offset arm 32 which engages the guide plate 17, so that the arm 1 cannot be sprung or bent in use. A guide pin 33 extends from the arm 1 to limit the space between which the gauge plate 30 is disposed.

With reference to the adaptor 14, FIGURE 2, at the gauging or feeler end of the gauge, it is a bifurcated member with holes 34 for receiving the pivot pin 15. It is provided with a chair-like member having a split seat 35 with flanges or walls 36 extending thereon, the space between the walls 36 and 37 being adapted to span the head 38 of a rivet, as shown in FIGURES 4 and 5. The rivet is in a recess 39 of the brake lining 40 and the gauge point 12 of the gauge is adapted to seat on the face 41 of the rivet while the flanges 36 and 37 of the adaptor span the head 38 of the rivet and engage the drum. The operation of the above-described brake lining gauge is briefly as follows:

The gauging points 12 and 13 of the gauge arms 1 and 2 are placed on a brake drum 42 in the manner shown in FIGURE 10. The gauge plate 30, which is mounted between the stop pin 27 and dowel 26 is loosened by turning the thumb nuts 25 to permit sliding the filler plate 22 on the guide plate 17 until the stop pin 27 abuts the pointer 16 of the gauge arm 1 and points to zero on the gauge plate 30. The thumb nuts 25 are then fastened to hold the gauge plate 39 in the zero position shown in FIGURE 10.

The gauge arms 1 and 2 are then squeezed together to spread the gauge points 12 and 13 to engage both the brake drum 42 and the brake lining 44 therebetween, as shown in FIGURE 11. Tension on the arms 1 and 2 is then released and torsion springs 6 and 7 will return the pointer to a position in the direction of the stop pin 27, as determined by the thickness of the brake drum and brake lining 42 and 44. As shown in FIGURE 11, this position is indicated as 40 on the gauge plate 30. It will be noted that the gauge plates are marked 3/16 and 1/4 and the plate is marked 3/16 on one side and 1/4 on the other, both sides being calibrated from zero to 100, as shown in FIGURES 7 and 8.

The distance from zero to 100 on the plate 30 of FIGURE 8 indicates a full 3/16 inch thickness of the brake lining and if, as shown in FIGURE 10, the 3/16 gauge plate was used, it is 40% worn in the position of the gauge in FIGURE 11.

If state law inspection requires at least 40% braking material as the thickness of the liner, the inspector would pass the brake lining at the 40% mark of FIGURE 11, and if the deadline for wear is set between 20 and 30, as shown by the line in FIGURES 10 and 11 of the drawing, no inspection certificate may be issued until the brake lining had been replaced.

With reference to FIGURES 4 and 5 of the drawing, it is apparent that the brake lining becomes ineffective when it is worn down to the rivet head, hence the use of the adapter 14 is necessary. It is used to measure the thickness of the lining above the rivet head 41 by setting the pointer at zero in the position of the gauge shown in FIGURE 5, and then reading the thickness when the gauge is placed over the drum and the liner in the same manner as the readings described in connection with FIGURES 10 and 11 of the drawing.

Referring to FIGURE 9, the side walls 36 and 37 abut the bottom of the brake drum as they expand the rivet head 38 so if the adapter is in the gauging position shown in FIGURES 4 and 5 and placed anywhere under the drum where the top gauging finger 12 can engage the lining 40, it will give the correct lining thickness reading on the gauge plate 30.

It is evident from the foregoing description of this invention that brake lining gauges made in accordance therewith establish beyond dispute the allowable operating thickness of brake lining for inspection approval to determine satfe operating conditions of the vehicle. This is not only useful for state law controlled inspection, but for use generally in places where automobile brake linings are repaired and replaced.

Although several embodiments of the invention have been herein illustrated and described, it will be evident to those skilled in the art that various modifications may be made in the details of construction without departing from the principles herein set forth.

We claim:

1. A thickness gauge for measuring the brake lining of automobile vehicles and the like comprising a pair of hinged arms fulcrumed adjacent one end having gauge points thereon, each of said arms having a guide plate overlapping the other of said arms to hold said arms in alignment, said arms being biased by a spring to bring said gauge points in abutting relation, one of said arms having a slotted mounting bracket, a slide plate adjustably mounted on said bracket, a gauge plate mounted on said slide plate, and the other of said arms having a pointer mounted to indicate the relative position of said arm on the gauge plate, said slide plate having an adjustable stop which is the zero position for said pointer on one side and a screw post extending into the slot of the mounting bracket on the other side thereof, said slide plate being adjustable to set the pointer to zero for one position of said hinged arms and said gauge plate having a notch at one end for resting against the stop of the slide plate whereby when the gauge is set with the gauge points engaging the material to be measured the gauge arm pointer will indicate the relative thickness of the material to indicate the degree of wear.

2. A thickness gauge as set forth in claim 1 in which the gauge plate is calibrated in terms of percentage of the relative thickness of the lining material.

3. A thicknes gauge as set forth in claim 1 in which the measuring end of the gauge is provided with an adapter to bridge the rivet heads on the brake drum to measure the thickness of the lining relative to the rivet head that is sunken in the lining material.

References Cited in the file of this patent

UNITED STATES PATENTS

| | | |
|---|---|---|
| 570,189 | Stromberg | Oct. 27, 1896 |
| 1,719,652 | Collins | July 2, 1929 |